United States Patent [19]

Brown et al.

[11] 3,964,597
[45] June 22, 1976

[54] METHOD AND APPARATUS FOR ARRANGING BRICKS INTO PROPER ROW SIZE FOR STACKING AND PACKAGING

[76] Inventors: John J. Brown; William F. Milholen, both of Pine Forest Drive, Siler City, N.C. 27344; Cletue E. Lineberry, Rte. 1, Box 106, Staley, N.C. 27355

[22] Filed: July 29, 1974

[21] Appl. No.: 492,516

[52] U.S. Cl. .................................. 198/21; 198/24; 198/34; 214/6 A
[51] Int. Cl.² .................................. B65G 47/74
[58] Field of Search .................. 198/21, 24, 20, 30, 198/31 AB, 34, 106, 107; 214/6 A, 10.5 D

[56] References Cited
UNITED STATES PATENTS

| | | | |
|---|---|---|---|
| 2,768,756 | 10/1956 | Horman | 198/24 X |
| 3,563,360 | 2/1971 | Wickersheim | 198/24 X |
| 3,570,209 | 3/1971 | Salwasser | 198/24 X |
| 3,729,084 | 4/1973 | Stuart | 198/21 |
| 3,811,549 | 5/1974 | Preisig | 198/21 |

*Primary Examiner*—Evon C. Blunk
*Assistant Examiner*—James L. Rowland

[57] ABSTRACT

Brick courses are successively lifted and transferred from a kiln car onto the receiving end of a marshalling table with the longitudinal dimension of bricks extending transversely of the table. A push mechanism pushes against the cut surface of the bricks and moves the bricks longitudinally of the table toward the discharge end thereof, urging the bricks against an upstanding wall of a movable, marshalling carriage. The carriage slides from a first position beneath the discharge end of the marshalling table to a second position beyond the discharge end in response to the pressure exerted by the push mechanism. When a prescribed number of bricks have been pushed against the upstanding wall and the movable carriage moved to its second position, the push mechanism is deactivated and a clamp engages and holds the bricks remaining on the marshalling table. The marshalling carriage is then moved an additional distance to space the bricks thereon from the bricks remaining on the marshalling table. A transverse pushoff means then moves the bricks from the carriage transversely onto the receiving end of a conveying apparatus from whence the bricks are moved to a stacking and strapping apparatus.

11 Claims, 5 Drawing Figures

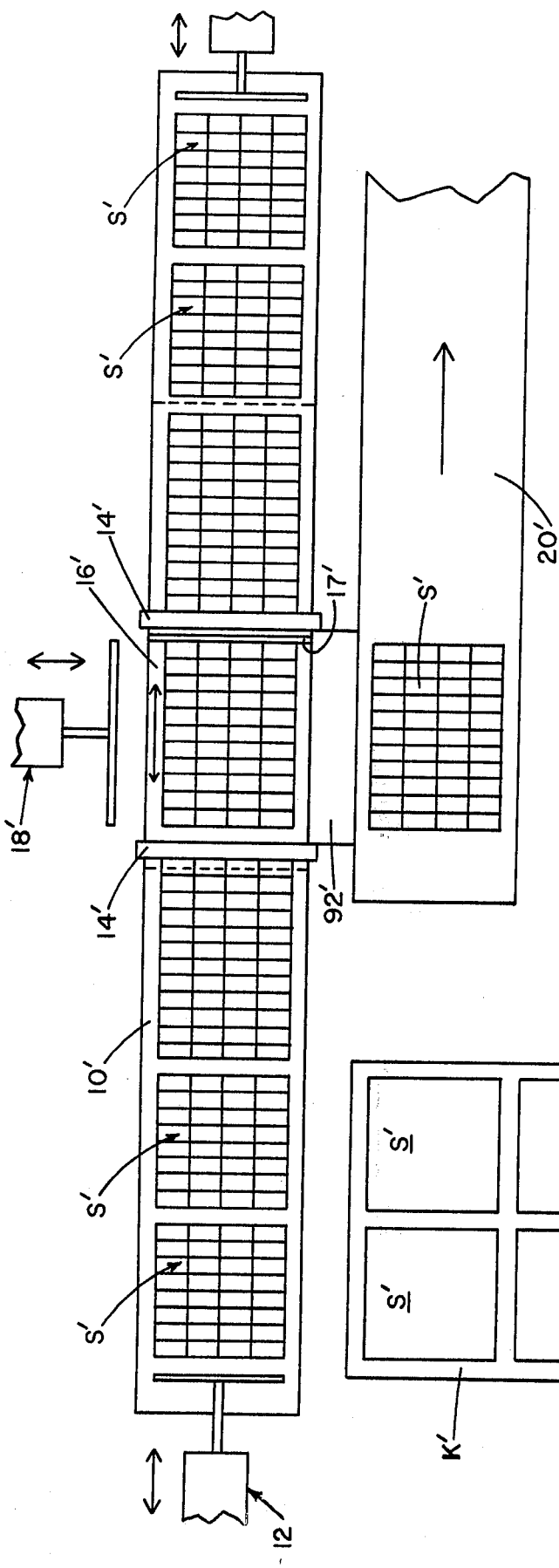
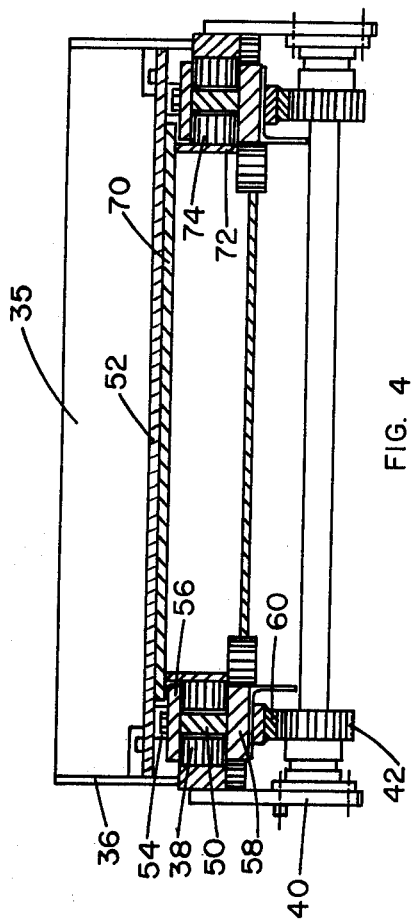
FIG. 4
FIG. 5

METHOD AND APPARATUS FOR ARRANGING BRICKS INTO PROPER ROW SIZE FOR STACKING AND PACKAGING

BACKGROUND OF THE INVENTION

In accordance with conventional practices, bricks are arranged for firing on kiln cars in a plurality of stacks, two or three stacks across the width of the kiln car and two to four stacks along the length thereof. The number of stacks may vary depending on the size of the kiln car. Each stack includes a plurality of double layer courses with each successive course having the headers thereof facing perpendicular to the headers of the preceeding course. Each course conventionally comprises one, two or three layers with each layer containing a plurality of rows and columns, however it is feasible to have more layers per course. The bricks in each column are arranged end to end, and the bricks in the rows are spaced apart from side to side.

The courses on the kiln car do not generally correspond to the courses in the final strapped package as far as the number of bricks in each row is concerned. Therefore, the courses cannot be removed from the kiln car and stacked directly atop each other to form the package because the number of bricks in each row must be changed. It is also true that the number of bricks in each column on the kiln car is not generally the same as the number of bricks in each column of the finished package, however this is for the most part immaterial as the stacker successively receives columns of bricks continuously fed thereinto and forms the bricks into one long continuous columnar package, which is subsequently cut off to a desired number of columns in a well known manner.

Regrouping of the brick courses unloaded from the kiln car into courses having rows of proper number for the final package does present a problem, however, which has been solved previously in a number of different ways. One such solution includes the breaking down of courses from the kiln car into single rows on an off-bearing conveyor, moving the bricks in single file along the conveyor and regrouping by some mechanism at the end of the conveyor into rows of the proper length. The rows are then reformed into courses and stacked in the final package. Another solution to the problem is shown in U.S. Pat. No. 3,776,398 wherein a special pick-up head which unloads the bricks from the kiln car and transfers them to the conveyor is peculiarly adapted to rearrange the bricks in mid-air by a shifting of the pick-up gripper elements. Both of these approaches, however require relatively expensive equipment.

SUMMARY OF THE PRESENT INVENTION

In accordance with the present invention, there is provided another approach which includes a simplified and less expensive method and apparatus whereby a unique marshalling apparatus receives brick courses from the kiln car and rearranges them into courses with rows of the proper number of bricks. In general, such an apparatus includes a table means which is positioned adjacent the kiln car and has a receiving end and a discharge end. Brick courses are initially deposited on the receiving end with the columns thereof extending transversely of the table and the rows thereof extending longitudinally thereof. A push means is provided for engaging the cut surface of the bricks and moving the bricks deposited on the receiving end toward the discharge end. A movable or marshalling carriage is connected to the discharge end of the marshalling table for reciprocation longitudinally thereof between a first position beneath the discharge end and a second, partially extended position beyond the discharge end. An upstanding wall attached to the leading edge of the slidable carriage against which the bricks are pushed provides the means for transferring the pushing force to the movable carriage. As the pushing continues, the carriage is moved to its second position. When a prescribed number of bricks in each row have been moved onto the carriage a clamp means at the end of the marshalling table is activated to grip the first column of bricks remaining on the marshalling table. At the same time the push means is deactivated and a second pushing means connected directly to the marshalling carriage is activated to move the carriage to a third, fully extended position. A transverse pushoff apparatus then transfers the brick course accumulated on the carriage onto a conveying means which carries the bricks on to the stacker.

It should be noted that heretofore, it has not been practical to move double layers of bricks which are supported on the stretchers of the bricks in a direction perpendicular to the cut faces of the bricks, because when the movement stops, the upper layer tends to topple from the lower layer because of the momentum. The combination of the upstanding wall and the clamp means now make such a pushing operation possible. It should be noted that since, during the initial pushing operation, the first column of bricks are moved into engagement with an upstanding wall, if the speeds are adjusted properly and if the marshalling carriage is stopped before the movement to the third position is begun, it may be possible to operate without the clamp means. However the clamp means is preferred to insure that toppling does not occur.

The clamp means includes an air bag supported above the discharge end of the marshalling table which is normally out of engagement with the bricks passing therebeneath. It is, however, activated responsive to the carriage engaging a limit switch to move into clamping engagement with the first column of bricks to be left on the marshalling table during any one selected cycle. Therefore, as the carriage reaches its second position, a limit switch is engaged by the carriage to clamp down on the top surface of the bricks, so that they will not topple as the bricks on the carriage are subsequently moved to a spaced position away from the marshalling table.

It is therefore an object of the present invention to provide a unique apparatus and method for regrouping courses of brick received from a kiln car into courses having rows of a prescribed size in preparation for the stacking and strapping operation.

It is a further object of the present invention to provide an apparatus of the type described wherein double layers of bricks may be moved in a direction perpendicular to the cut face thereof without toppling at the end of the stroke.

Other objects of the invention will become apparent upon reading the following detailed description of a preferred embodiment of the invention, along with an inspection of the accompanying drawings, in which:

FIG. 4 is a sectional view taken substantially along lines 4—4 in FIG. 3; and

FIG. 5 is a schematic plan view, similar to FIG. 1, except showing an alternate embodiment of the present invention.

Figure 1:
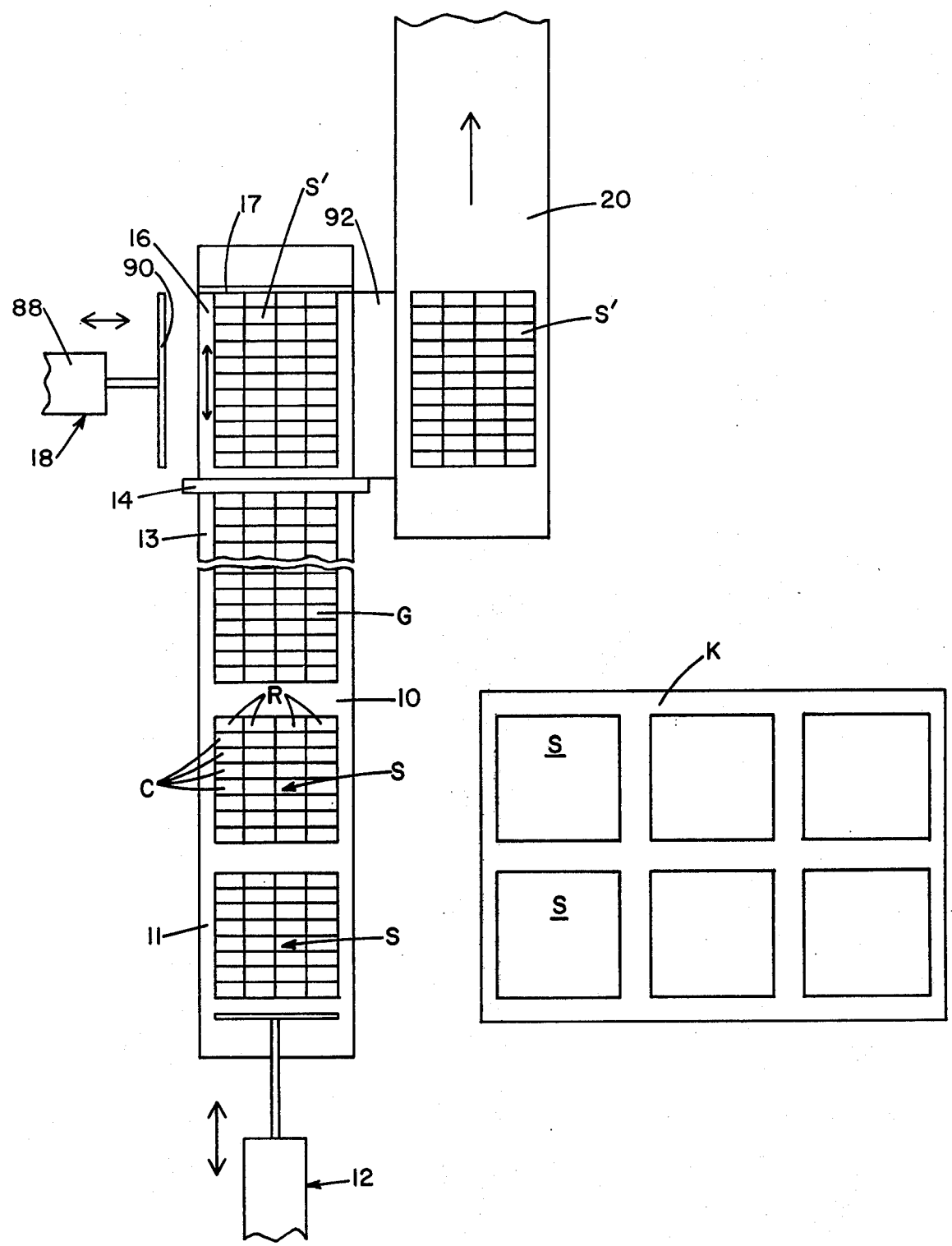
FIG. 1 is a schematic plan view of the apparatus according to the present invention.

Turning now to the drawings, and particularly to FIG. 1, it is conventional practice in the brick making industry to position bricks on kiln cars K for firing in the kiln. As described hereinabove, the bricks are conventionally stacked on the kiln cars in a plurality of stacks S, the number of stacks depending on the size of the kiln car K. Each stack S includes a plurality of doublelayer courses stacked one atop each other with the headers of successive courses facing in a direction perpendicular to the headers of the courses above and below in order to achieve more even distribution of the heat over each brick. Each course or each layer thereof comprises a plurality of rows R of brick arranged sidewise from each other and a plurality of in columns C with the bricks therein in generally abutting and end to end relationship. As the bricks are unloaded by a conventional unloading head (not shown), alternate courses are rotated 90° so that each course is set down on a marshalling table 10 with the rows thereof extending longitudinally of the table 10 and the columns thereof extending transversely thereof.

In general, the present invention is directed to a grouping apparatus which includes a table means 10 positioned adjacent the unloading position of kiln car K and having a receiving end 11 and a discharge end 13. A pushing means 12 is positioned at the receiving end of the table means 10, hereinafter called "the marshalling table", for urging the courses S longitudinally of the marshalling table toward the discharge end thereof.

A carriage means 16 is positioned to reciprocate longitudinally from a position beneath the discharge end of table 10 to a second position extending partially outwardly therefrom and then to a third fully extended position as illustrated in FIG. 1. The carriage means is slidably attached to the framework of marshalling table 10 and is moved from its first to its second position responsive to the action of pushing means 12 against the bricks. A second pushing means is attached to the carriage means 16 to move it to its fully extended position.

As carriage 16 (hereinafter referred to as a "marshalling carriage") is urged to its second position and a prescribed number of bricks are moved thereonto, a clamp means 14 is activated to engage the remainder of the bricks at the end of marshalling table 10 as the carriage 16 is moved to its third position. A conveyor means 20 includes a receiving end positioned adjacent the discharged end 13 of marshalling table 10. A transverse pushoff means 18 moves the bricks collected on the marshalling carriage 16 transversely thereof onto said conveying means 20, preferably across an intermediate plate 22 which bridges the space between the marshalling carriage and the conveying means.

Figure 2:
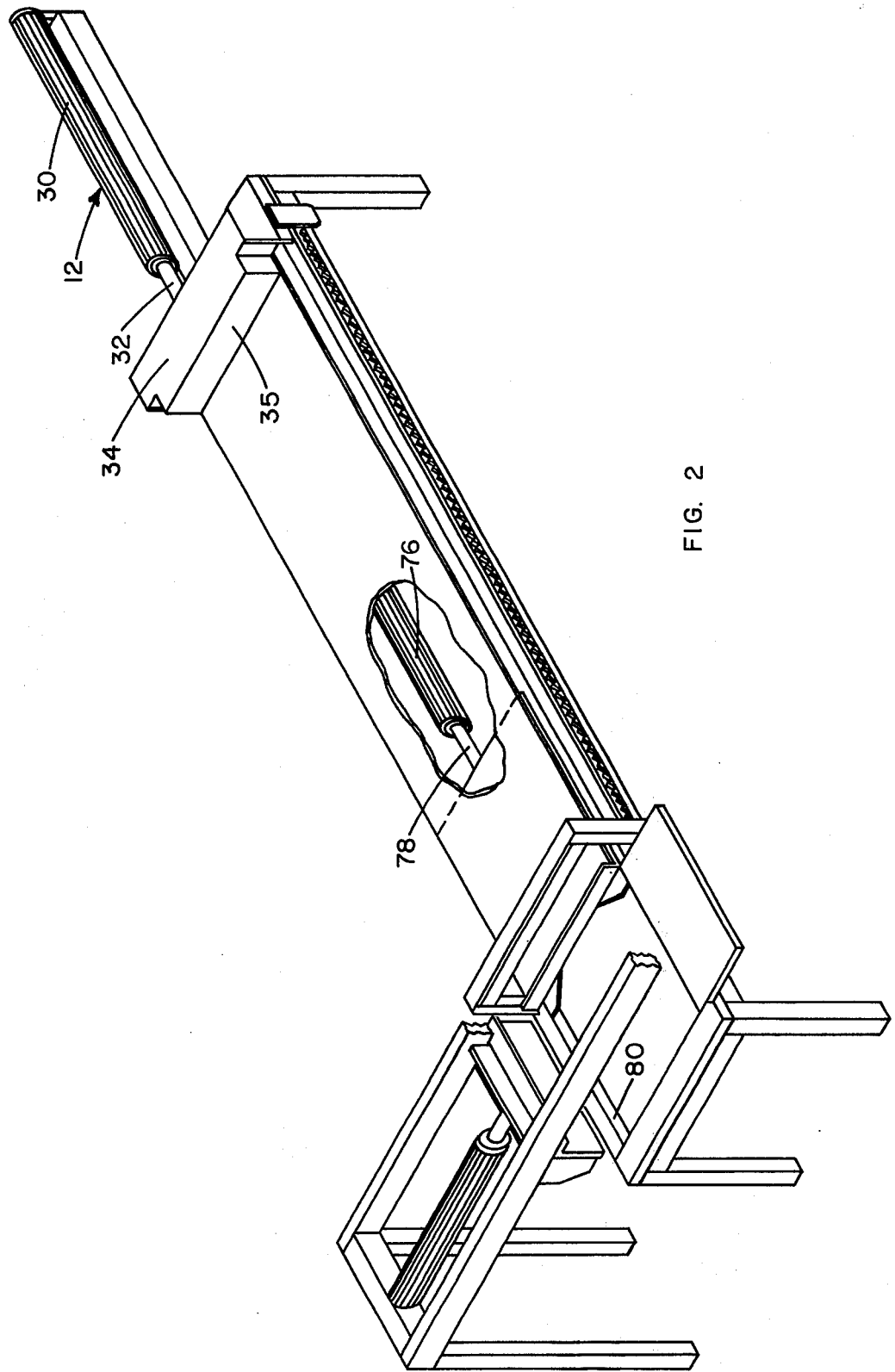
FIG. 2 is a perspective view of the marshalling table and push-off means illustrated in FIG. 1.
Figure 3:
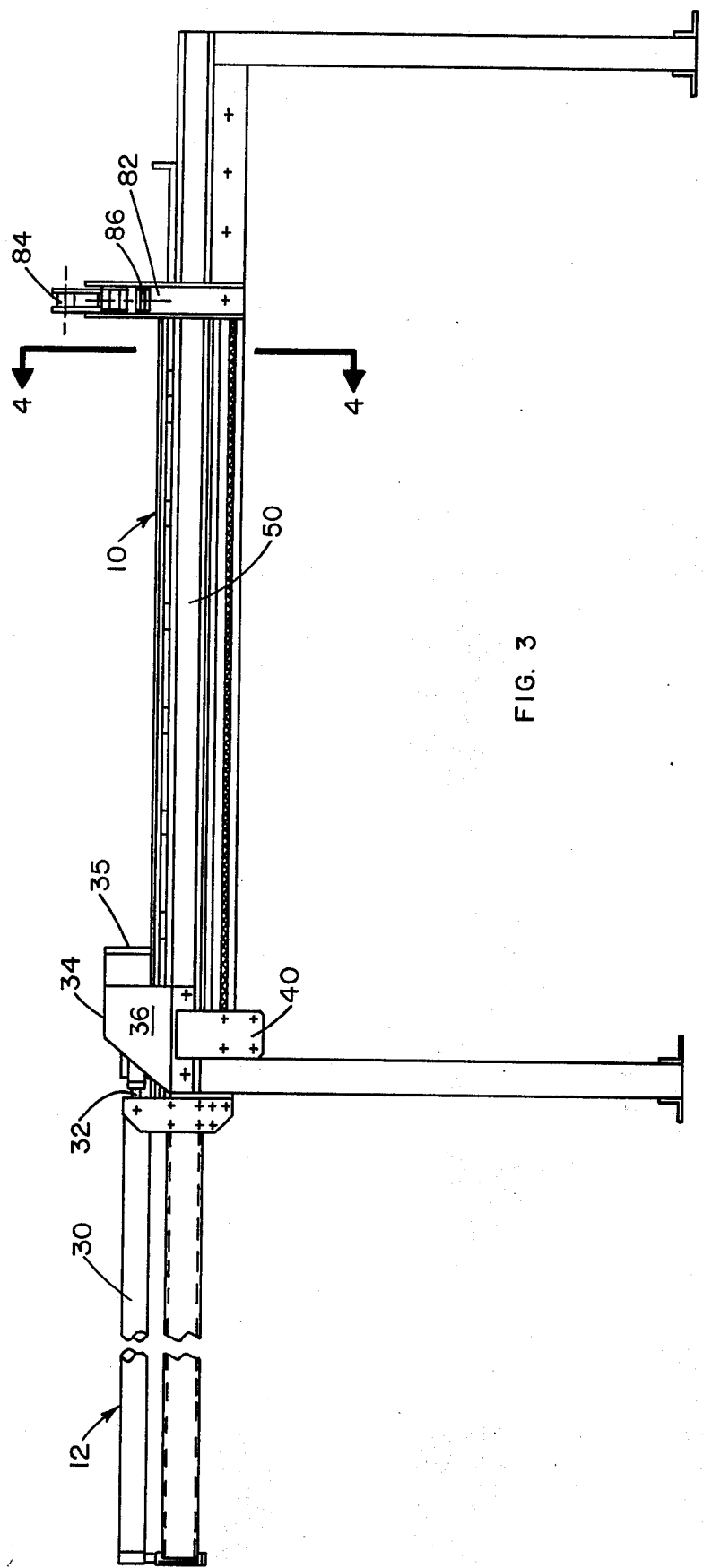
FIG. 3 is a side elevation of the marshalling table.

More specifically, the first pushing means, or more properly the marshalling pusher 12, includes a cylinder 30 (either air or hydraulic) and piston 32 assembly with a push head 34 attached to the front end thereof (FIGS. 2–4). A pushing plate 35 extending across the width of the brick courses is secured to the front portion of pushing head 34, and is the portion of the pushing head which engages the bricks themselves. The pushing head 34 includes a pair of side walls 36 which carry a pair of inturned rollers 38 which are supported by the frame of marshalling plate 10 as described hereinafter. A pair of depending brackets 40 carry a lower pinion 42 which engages a rack 60 attached to the underside of frame 50 of the marshalling table 10 to guide the pushing assembly and keep it aligned as it moves along the marshalling table 10. Alternatively, the piston 32 and cylinder 30 could be replaced by a rotary drive means which drives pinion 42 along rack 60.

The marshalling table 10 includes a pair of spaced parallel side frames 50 which include upper flange 56 and lower flange 58 (FIG. 4). A top wear plate 52 is mounted above flange 56 and spaced therefrom by means of spacers 54. A pair of longitudinal ribs 53 extend upwardly from the surface of top wear plate 52 and longitudinally thereof to prevent bricks from being urged transversely of their normal path. A rack 60 is secured to the underneath side of flange 58 to guide pinions 42, which in turn prevents skewing of the pushing head 34 as it moves along marshalling table 10. The space between upper flange 56 and lower flange 58 and on the outer sides thereof provide a track for rollers 38 which facilitate the movement of the pushing head 34 along table 10.

Marshalling carriage 16 includes a receiving plate 70 having an upturned end wall 17 at the outer end thereof. A pair of support walls 72 extend downwardly from plate 70 for mounting rollers 74 which, in turn, support the marshalling carriage 16 on the inner portion of flanges 58. A cylinder 76 is attached to a permanent portion of frame 50 and the free end of the piston 78 is attached to the rear or inner edge of marshalling plate 50. A limit switch 80 is suitably mounted on frame 50 in the path of marshalling carriage 16 and suitably connected to both clamp 14 and cylinder 76. When the carriage 16 engages limit switch 80 indicating that a prescribed row length has been attained, clamp 14 is activated in a manner to be described hereinafter. Simultaneously cylinder assembly 76 is activated to gently move the marshalling carriage a prescribed short distance to the fully extended position to provide a space between the last column of bricks on the marshalling carriage 16 and the first column of bricks remaining beneath the clamp on the marshalling table 10. The aforesaid shift must be gentle to prevent toppling of the unsupported bricks on carriage 16.

During the movement of marshalling carriage 16 from its retracted position to its second position, cylinder 76, which is normally urged to a retracted position is overcome until the limit switch is engaged as discussed hereinabove.

Clamp 14 is a conventional air bag type clamp which includes a frame 82, a manifold 84, and an air bag 86 connected to the frame and supplied by air from the manifold 84. When activated, the air bag is filled with air and expands to a position in engagement with the upper surface of the last column of bricks on the marshalling table 10. Otherwise, when the air bag 86 is deactivated and the air is released, the bag is out of engagement with the bricks.

The transverse pushoff apparatus 18 includes a cylinder and piston assembly 88 with a plate 90 attached to the free end of the piston. When marshalling carriage 16 is moved to its fully extended position, the pushoff assembly is activated to transfer the course of bricks on the marshalling carriage across the optional transition plate 92 onto the receiving end of a conveying means 20, from whence the courses S', which are in proper row length, are transferred onto a stacking and strapping apparatus (not shown).

In operation, in the illustrated embodiment, two courses S are unloaded from kiln car K and positioned on the receiving end of marshalling plate 10, whereupon the push mechanism 12 is activated to accumulate the two courses S and move them together on toward the discharge end 13 of table 10. The marshalling carriage at this time is in the retracted position and the clamp 14 is in the non-clamping position. As the bricks move through what is known as the surge area against the upstanding wall 17 of the marshalling carriage 16, the continuous pressure exerted by the push mechanism 12 begins to move the marshalling carriage outwardly against the air or fluid pressure of cylinder 76.

When a prescribed number of bricks per row have been moved on to the marshalling carriage (generally 11 bricks per row), limit switch 80 is engaged. Clamp means 14 is activated to clamp the forwardmost column of bricks on the marshalling table 10 and prevent the toppling thereof. Simultaneously push mechanism 12 is deactivated, cylinder 76 is activated to move the marshalling carriage 16 gently and smoothly to its fully extended position. This provides clearance for plate 90 of pushoff mechanism 18 to operate without engaging the clamp 14 or the remaining bricks on marshalling table 10. As the marshalling carriage reaches its fully extended position, the push mechanism 18 is activated to transfer the course with the prescribed number of bricks per row onto the conveyance 20 which carries the bricks on to the stacking and strapping apparatus.

At this time if the bricks remaining on the marshalling table include less than the prescribed number of bricks to be loaded on to the marshalling (generally 11), the push mechanism 12 will have been retracted to group and push another group of courses S down the marshalling table 10. If, on the other hand, at least the prescribed number of bricks per row remain on the marshalling table, the push means 12 will not be recycled. Rather, as air bag clamp 14 is released and carriage 16 returned, it will exert pressure longitudinally of the marshalling table 10 to move the bricks gathered at the discharge end of the table 10 onto the marshalling carriage as described above. This portion of the cycle continues until less than the prescribed number of bricks to be moved onto the marshalling carriage are gathered at the discharge end of the table. This cycle change is accomplished by means of an indicator feeler, photocell, or other switch means (not shown) on the marshalling table which indicates when the prescribed number of bricks per row or more bricks remain on the marshalling table 10.

In FIG. 5, an alternate embodiment is illustrated in which bricks are loaded on to the marshalling table 10' from each end thereof and moved toward the middle. This permits unloading two kiln cars at once from opposite ends of the marshalling table. It can easily be seen that in this embodiment there are effectively two marshalling tables 10' with the discharge ends thereof directed toward each other. A clamp 14' is located at the discharge end of each table, however a common marshalling carriage 16' is used with the upstanding wall 17' in the center thereof. Therefore, as the marshalling carriage 16' is being extended from beneath one of the marshalling tables 10', the other side of the marshalling carriage (on the other side of upstanding wall 17') is being returned to its retracted position ready to be recharged when the direction reverses. With this embodiment, production is increased and duplication of the marshalling carriage, pushoff assembly 18' and takeoff conveyance 20' is not necessary.

Although the specification describes two illustrative embodiments in which bricks are regrouped from courses of 8 in a row to 11 in a row, it is obvious that other combinations of regroupings may be formed by utilizing the apparatus illustrated hereinabove. Moreover, although one specific means for activating marshalling carriage 16 is described, it is apparent that other arrangements could also be utilized. Again although the illustrations show two courses of bricks being unloaded simultaneously it is apparent that any number of unloading heads could be used.

Although a preferred embodiment has been described and illustrated, it is obvious that other modifications and improvements might be made to the apparatus and method described hereinabove without departing from the spirit of the invention, the scope of which is to be determined by the following claims.

What is claimed is:

1. Apparatus for altering the row sizes of brick courses removed from a kiln car in preparation for stacking and strapping comprising:
    a. table means having a receiving end and a discharge end;
    b. means for accumulating and moving courses of bricks removed from said kiln cars and deposited on said receiving end toward the discharge end, said courses comprising a plurality of rows and columns with a known number of bricks therein;
    c. carriage means slidably attached to the discharge end of said table means for reciprocation longitudinally thereof between a first, retracted position beneath said discharge end and a second, partially extended position beyond said discharge end responsive to the movement of said means for moving bricks deposited on said receiving end toward the discharge end;
    d. a pushing means connected to said carriage means for moving said carriage means to a third, fully extended position responsive to the completion of the movement of said carriage to said second position; and
    e. push-off means positioned adjacent said carriage means when in said third, fully extended position for moving the bricks collected on said carriage means transversely thereof.

2. The apparatus according to claim 1 wherein said carriage means includes an upstanding wall in the path of said bricks along said table against which bricks are urged to move said carriage means from its first to its second position.

3. The apparatus according to claim 1 and further including a clamping means associated with the discharge end for supporting the bricks remaining on said table means when a prescribed number of bricks per row are moved onto said carriage means.

4. The apparatus according to claim 3 wherein said clamp means includes an air bag means mounted above the path of said bricks at the discharge end of said table means and normally out of engagement with said bricks, said air bag means being activated responsive to the movement of said carriage to said second position.

5. Apparatus for altering the row sizes of brick courses removed from a kiln car in preparation for stacking and strapping into final packages comprising:
   a. a marshalling table including an upper plate being at least as wide as one of said courses of bricks and including a receiving portion and a discharge portion;
   b. a pusher device positioned adjacent the receiving portion and arranged to move longitudinally of said upper plate, a pushing plate attached to the free end of said pushing device and extending transversely of said upper plate, said pushing plate being of a length approximately the same as the width of marshalling table;
   c. a marshalling carriage including a receiving plate having an inner end an outer end, means for slidably mounting said receiving plate to the discharge portion of said marshalling table for reciprocation between a first position beneath said discharge portion and a second position extending beyond said discharge portion, and an upstanding wall extending across the outer end of said carriage and extending upwardly above the end of said upper plate at the discharge end thereof in the path of said bricks along said marshalling table;
   d. a limit switch in the path of said marshalling carriage for generating a signal when a prescribed number of bricks in each row have been transferred from the discharge end of said marshalling table onto said marshalling carriage;
   e. a clamp means positioned at the end of said discharge portion and normally out of engagement with said bricks, said clamp means being activated responsive to said signal for moving into clamping engagement with the bricks remaining on said marshalling table;
   f. a second piston and cylinder assembly mounted on said marshalling table with the free end of said piston connected to said marshalling carriage and operative responsive to said signal for moving said carriage to a third, fully extended position;
   g. a pushoff device positioned adjacent said carriage means in said third position and including a plate selectively reciprocal transversely across the brick path along said conveyance for moving the course of bricks collected on said marshalling carriage therefrom.

6. The apparatus according to claim 5 wherein said clamp means includes an air bag mounted above the path of bricks at the end of said discharge portion, extending transversely across the width of said marshalling table, and normally out of engagement with said bricks, said air bag when activated expanding to a position in engagement with the bricks.

7. Apparatus for altering the row sizes of brick courses being removed simultaneously from a plurality of kiln cars in preparation for stacking and strapping comprising:
   a. a pair of table means with each table means having a receiving end and a discharge end, the table means being so arranged that the discharge ends of each of said table means are at ends facing towards each other with a space therebetween and the receiving portions are at ends facing away from each other;
   b. means for accumulating and moving courses of bricks removed from said kiln cars and deposited on each of said receiving ends toward the discharge ends, said courses comprising a plurality of rows and columns with a known number of bricks therein;
   c. carriage means connecting the discharge ends of said table means and slidably connected thereto for reciprocation longitudinally thereof between a first position partially beneath one discharge end and extended beyond the other discharge end and a second position extended beyond said one discharge end and partially beneath said other discharge end; and
   d. pushoff means positioned adjacent said carriage means at a point transversely adjacent the area between said discharge ends and operable to move through said area for moving bricks collected on said carriage means transversely thereof.

8. The apparatus according to claim 7 wherein said carriage means is reciprocally moved between said first position and said second position responsive to the movement of said means for moving bricks deposited on said receiving ends toward said discharge ends.

9. The apparatus according to claim 8 wherein said carriage means includes an upstanding wall extending transversely thereacross at a point approximately in the center thereof and in the path of said bricks along said table means against which bricks are urged alternately from said one of said table means and then the other to move said carriage back and forth.

10. The apparatus according to claim 7 and further including a clamping means associated with each discharge end for supporting the bricks remaining on said table means when a prescribed number of bricks per row have been moved onto said carriage means.

11. The apparatus according to claim 10 wherein each of said clamp means includes an air bag means mounted above the path of said bricks at the corresponding end of said table means and normally out of engagement with said bricks, each of said air bag means being activated in response to movement of said carriage to the corresponding extended position.

* * * * *